US012319371B2

(12) United States Patent
Hambloch et al.

(10) Patent No.: US 12,319,371 B2
(45) Date of Patent: Jun. 3, 2025

(54) METHOD FOR DETERMINING A STEERING DAMPING REQUIREMENT, STEERING SYSTEM, COMPUTER PROGRAM PRODUCT AND STORAGE MEDIUM

(71) Applicant: ZF Automotive Germany GmbH, Alfdorf (DE)

(72) Inventors: Peter Hambloch, Krefeld (DE); Andreas Kotz, Duisburg (DE); Martin Gebing, Vreden (DE)

(73) Assignee: ZF Automotive Germany GmbH, Alfdorf (DE)

( * ) Notice: Subject to any disclaimer, the term of this patent is extended or adjusted under 35 U.S.C. 154(b) by 268 days.

(21) Appl. No.: 17/742,577

(22) Filed: May 12, 2022

(65) Prior Publication Data

US 2022/0371658 A1 Nov. 24, 2022

(30) Foreign Application Priority Data

May 18, 2021 (DE) .......................... 102021204996.6

(51) Int. Cl.
 B62D 6/00 (2006.01)
 B62D 5/04 (2006.01)
(52) U.S. Cl.
 CPC ........... B62D 6/008 (2013.01); B62D 5/0481 (2013.01)
(58) Field of Classification Search
 CPC ........ B62D 6/00; B62D 6/008; B62D 5/0481; B62D 5/0463; B62D 5/0472
 See application file for complete search history.

(56) References Cited

U.S. PATENT DOCUMENTS

| 5,719,766 | A | 2/1998 | Bolourchi et al. | |
|---|---|---|---|---|
| 7,720,583 | B2 | 5/2010 | Takamatsu et al. | |
| 9,254,862 | B2 | 2/2016 | Kezobo et al. | |
| 2019/0047618 | A1* | 2/2019 | Hultén | B60W 10/30 |
| 2020/0406964 | A1* | 12/2020 | Hultén | B62D 6/008 |
| 2022/0289205 | A1* | 9/2022 | Kodera | B60W 40/105 |
| 2022/0289288 | A1* | 9/2022 | Hultén | B62D 6/008 |
| 2022/0315097 | A1* | 10/2022 | Yoshida | B62D 6/008 |
| 2022/0315103 | A1* | 10/2022 | Mori | B62D 5/0463 |
| 2024/0375709 | A1* | 11/2024 | Hultén | B62D 6/002 |

FOREIGN PATENT DOCUMENTS

DE 102019108486 A1 10/2019
WO 2019115563 A1 6/2019

* cited by examiner

*Primary Examiner* — John Kwon
(74) *Attorney, Agent, or Firm* — Kristin L. Murphy

(57) ABSTRACT

The present disclosure relates to a method for determining a steering damping requirement of a steering device of a vehicle, a steering system, a computer program product and a computer-readable storage medium. The steering device is part of a steering system of the vehicle and is coupled to at least one actuator which is configured to apply a steering torque to the steering device. The method comprises at least the step of determining the steering damping requirement based on at least one rack force of the steering system, wherein the steering damping requirement forms at least a portion of a target steering torque with which the steering device can be acted upon by the at least one actuator.

14 Claims, 5 Drawing Sheets

METHOD FOR DETERMINING A STEERING DAMPING REQUIREMENT, STEERING SYSTEM, COMPUTER PROGRAM PRODUCT AND STORAGE MEDIUM

CROSS-REFERENCE TO RELATED APPLICATION

This application claims priority to German Priority Application No. 102021204996.6, filed May 18, 2021, the disclosure of which is incorporated herein by reference in its entirety.

TECHNICAL FIELD

The present disclosure relates to a method for determining a steering damping requirement, a steering system, a computer program product and a computer-readable storage medium.

BACKGROUND

In the case of electromechanical steering systems or by steer-by-wire steering systems, a mechanical coupling of the steering device (steering wheel, joystick) to the wheel to be controlled can be dispensed with. In order to provide the user of the vehicle with a natural steering feel despite the lack of mechanical coupling, steering systems of this type comprise actuators which interact with the steering device. A target steering torque requirement is determined for the actuator. This is compared with an actual steering torque applied to the steering device, so that a corresponding manipulated variable for the actuator can be determined by a control circuit. In accordance with the manipulated variable, the actuator acts on the steering device in order to adapt the actual steering torque to the target steering torque, which provides the driver with a natural steering feel.

In this context, FIG. 1, which is a partial extract from WO 2019 115 563 A1, discloses a corresponding determination method 10 for the target steering torque requirement 22. A base steering torque 12 is determined based on the rack force (RackF) and the vehicle speed (Vspd) as input variables. In addition, a return torque 14 is determined with the following input variables: steering wheel angle (Ipos), driving torque (Dmom) and vehicle speed (Vspd). Furthermore, a damping torque 16 is determined with the following input variables: steering wheel angular velocity (Ivel), driving torque (Dmom) and vehicle speed (Vspd). In addition, a hysteresis torque 18 is determined based on the driving torque (Dmom) and vehicle speed (Vspd) as input variables. Further individual torques are possible, but are of no significance for the present disclosure. From the individual torques 12, 14, 16, 18, a sum torque 20 is then formed, which determines the target steering torque requirement 22.

However, with regard to the return torque 14, the damping torque 16 and the hysteresis torque 18, WO 2019 115 563 A1 discloses that, with the exception of vehicle speed, the only input variables used are those that are directly related to the drivers input or the position or movement of the steering device (steering wheel, joystick). As a result, however, precisely those parameters are used as input variables that are influenced by the result of the control. This is because the adjustment of the actual steering torque to the target steering torque requirement through the manipulated variable that is provided for the actuator influences the input variables used. In other words, changes during the coordination of the steering feel have an effect on the drivers torque steering feedback and thus in turn influence the functions that are dependent on the driver and which, according to the prior art, are used as input variables for determining individual torques 14, 16, 18. As a result, the control mechanism comprises an intrinsic additional loop. Feeding back the controlled variable and using it as an input signal is at least disadvantageous in terms of control speed, time delay and therefore control stability.

In addition, the steering device torque varies with respect to the transverse acceleration of the vehicle, insofar as the steering feel is readjusted or varied (non-linear dependency), and is therefore less predictable, especially since the steering torque always contains a damping component depending on the coordination of the steering feel.

With regard to different vehicle parameters, for example the weight as a function of the configuration, the approach according to the prior art is in need of improvement. Through the use of scaling factors, for example, a weight adjustment is taken into account when determining a basic steering torque in order to give the driver a consistent steering feel. As a result, other functions that use the steering torque as an input variable would also have to be adapted. This process involves a high level of expenditure, is complex and is usually neglected.

In a similar way, according to the prior art, changes in friction of the road surface are only taken into account indirectly by the force feedback characteristic diagram in order to report the changes in friction to the driver.

What is needed is a method for determining a target steering torque requirement in which the disadvantages of the prior art can be eliminated or at least reduced.

SUMMARY

Among other things, a method, a steering system; a computer program product and a storage medium are provided herein. Advantageous refinements of the disclosure are specified in the dependent claims. Individual exemplary arrangements are explained with reference to the method; others with reference to the device. The exemplary arrangements are to be mutually transferred accordingly.

According to a first exemplary arrangement, a method for determining a steering damping requirement of a steering device of a vehicle is provided. The steering device is part of a steering system of the vehicle and is coupled to at least one actuator. The actuator is configured to apply a steering torque to the steering device. The method comprises the step of determining the steering damping requirement based on at least one rack force of the steering system. The steering damping requirement forms at least a portion of a target steering torque with which the steering device can be acted upon by the at least one actuator.

In one exemplary arrangement, the rack force has a fixed relative ratio to a transverse acceleration of the vehicle. As a result, the rack force is independent of a generally variable coordination or readjustment of a steering feel, which can be adapted for a driver by an actuator coupled to the steering device (steering wheel, joystick). The control loop therefore has no additional intrinsic loop using the rack force. The intrinsic loop, which is provided in the prior art, represents a damping for the hysteresis behavior of the torque. In contrast, the hysteresis of the rack force is lower and more consistent, since it does not include such a damping component as a result of the tuning. For this reason, a determination of the steering damping requirement is advantageously, on the one hand; more robust with respect to an adaptation of the driving feel and, on the other hand, the control can take place more quickly because the settling time is shortened. Due to the fixed relative ratio of the rack force to the transverse acceleration, changes in friction of the road surface are also taken into account directly through the use of the rack force. Indirect consideration by characteristic diagrams, which are necessary in the prior art, can advantageously be avoided. Thus, the changes in friction are taken into account immediately without a time delay (no additional intermediate steps), with the determination of the steering damping requirement nevertheless having a reduced complexity.

The steering damping requirement can also be determined based at least on a vehicle speed, on a steering position determined by the steering system of the vehicle, and on a steering velocity determined by the steering system. This allows the steering damping requirement to be determined more precisely.

The steering position determined by the steering system of the vehicle can, for example, be a position of the steering device, i.e. a steering angle. The position can also be a wheel deflection based on a straight-ahead driving position. Furthermore, the position can also be a transverse displacement of the rack or a displacement of a tie rod relative to a normal position (central position). Information about the position can also be supplied by the drive (e.g. a motor) within the steering system. The position can also be an angle of a joint associated with the steering system. The position is accordingly a position, determined by the steering system, of a part of the steering system that is displaced relative to a normal position (straight-ahead driving position) when the steering wheel is turned. Alternatively, the previously mentioned positions within the control device can also be determined by conversion on the basis of a reference position (e.g. motor position in rack position).

The steering velocity determined by the steering system of the vehicle can, for example, be a velocity of the steering device, i.e. a rotational velocity of the steering device. However, the velocity can also be a deflection rotational velocity (steering velocity) of a wheel. Furthermore, the velocity can also be a displacement velocity of the rack or a displacement velocity of a tie rod relative to a normal position (central position). Information about the position can also be supplied by the drive (e.g. a motor) within the steering system. The velocity is accordingly a displacement, rotational or steering velocity of a part of the steering system, which is determined by the steering system and which is shifted relative to a normal position (straight-ahead driving position) when the steering wheel is turned. Usually, the above-mentioned velocities are also determined within the control device by conversion on the basis of a reference velocity (e.g. motor velocity in rack velocity).

Alternatively, or cumulatively, the method can also comprise at least the step of multiplying at least a first function value and a second function value in order to determine the steering damping requirement.

The first function value can be determined at least as a function of the rack force.

The second function value can be determined at least as a function of the vehicle speed, the steering position can be determined by the steering system and the steering velocity can be determined by the steering system. As a result, the steering damping requirement can be determined in an uncomplicated and needs-based manner.

At least one of the first and second function values can be determined based on at least sectionally defined functions and/or by characteristic curves and/or by characteristic diagrams and/or look-up tables. As a result, the function values can be determined beforehand based on test measurements and made available for a driving situation.

The at least sectionally defined functions and/or characteristic curves and/or characteristic diagrams and/or look-up tables can be variable as a function of a desired steering feel. In this way, for example, the determination of the steering damping requirement can be adapted to a desired driving style. According to the prior art, the functions, characteristic values or tables are also used to adapt the steering feel to changed suspension loads which must be borne by the steering system using scaling factors. In contrast, the rack force dependency advantageously itself adjusts the damping component for different suspension loads (vehicle parameters) of different vehicle configurations. Therefore, the functions, characteristic values or tables have fewer variables and are less complex, which makes the determination more precise.

The rack force can be based on a measurement, an estimate from a steering model or on a vehicle model and can be provided. In this respect, a sensor can be provided which measures an applied rack force in order to provide corresponding values. Models can also be used in advance to determine the rack force as a function of vehicle parameters (e.g. dimensions) and a vehicle speed. This possibility is based on the essentially fixed relative ratio of the rack force to the transverse acceleration of the vehicle. Furthermore, the rack force can be based on an estimate, provided that the corresponding steering system with steering-dependent variables is used as a basis. Of course, the approaches can also be combined.

In particular, the method is computer-implemented. The determination of the steering damping requirement can accordingly be determined by a data processing unit, which has advantages in terms of the speed of precision. In addition, a data processing unit-supported determination in the vehicle is easy to implement, for example via a control device.

If the underlying steering system does not comprise a rack, but a central rod arranged between the tie rods, the central rod force can also be used instead of the toothed rod force to determine the steering damping requirement. For such a central rod, too, the relative ratio to the transverse acceleration of the vehicle is generally fixed.

According to a second exemplary arrangement, a steering system for a vehicle is also provided. The steering system comprises at least one steering device, a rack, a control device and at least one actuator. The control device is coupled to the actuator. The control device is configured to determine a steering damping requirement of the steering device according to the method described herein. The steering damping requirement forms at least a portion of a target steering torque with which the steering device can be acted upon by the at least one actuator. The steering system thus makes it possible to define the steering damping requirement accordingly and to act on the steering device accordingly, which results in an improved steering feel for the driver because the determination is made faster and more precise.

Alternatively, or cumulatively, the control device can comprise at least one processor and be coupled to a memory device. At least sectionally defined functions and/or characteristic curves and/or characteristic diagrams and/or look-up tables are stored in the memory device so that at least one of the first to second function values can be determined by the control device based on data from the memory device. The processor can be designed in such a way that it determines the steering damping requirement according to the method described herein.

The steering system can furthermore comprise at least one sensor, by which a rack force applied to the rack can be measured. The rack force can thus advantageously be measured independently of time. The respective measured value can then be made available to the control device for determining the steering damping requirement.

The steering system can be a steering-by-wire steering system or an electromechanical steering system. The determination of the steering damping requirement can therefore be used in particular for steering systems having no mechanical coupling between the steering device and steerable components that are used to directly change direction of the vehicle.

All of the features explained with regard to the second exemplary arrangement can be transferred to the first aspect individually or in (sub-) combinations.

According to a third exemplary arrangement, a computer program product is provided. The computer program product comprises instructions which, when the program is executed by a computer, cause the computer to determine the steering damping requirement according to the method described herein.

According to a fourth exemplary arrangement, a computer-readable storage medium is provided. The storage medium comprises instructions which, when the program is executed by a computer, cause the computer to determine a steering damping requirement based on at least one rack force of the steering system.

All of the features explained with regard to the third and fourth exemplary arrangements can be transferred individually or in (sub-)combination to the first and/or second exemplary arrangement(s) as well as mutually.

The present disclosure can also be improved in that a steering return torque requirement and/or a steering hysteresis requirement is/are incorporated into the method, the steering system, the computer program product and the storage medium, as will be explained below.

In this case, a total target torque requirement is thus determined which includes the steering damping requirement as well as a steering return torque requirement and/or a steering hysteresis requirement. Scaling factors can be taken into account. The individual totals are determined based at least on the rack force as described herein. The resulting advantages apply cumulatively to the total target torque requirement.

According to an optional fifth exemplary arrangement, the method according to the disclosure can consequently also be supplemented with a method for determining a steering return torque requirement of a steering device of a vehicle. The additional method can include or comprise the step of determining the steering return torque requirement based on at least one rack force of the steering system. The steering return torque requirement can thus form a portion of a target steering torque with which the steering device can be acted upon by the at least one actuator (total target torque requirement).

Alternatively or cumulatively, the steering return torque requirement can furthermore be determined based at least on a vehicle speed, on a steering position determined by the steering system of the vehicle, and on a steering velocity determined by the steering system. As a result, the steering return torque requirement can be determined more precisely.

The steering return torque requirement can additionally or alternatively be determined on the basis of a proportional control loop with a proportionality factor and a base target velocity.

The rack force can be taken into account both when determining the proportionality factor and when determining the base target velocity. The proportional control loop allows a particularly fast adjustment in order to determine the steering return torque requirement. The rack force is advantageously used for both sub-parameters of the proportional control loop, so that the control loop is robust and fast.

Alternatively or cumulatively, the method can also comprise at least the step of multiplying at least a first function value and a second function value in order to determine a product value.

The first function value can be determined at least as a function of the rack force.

The second function value can be determined at least as a function of the vehicle speed and the steering position determined by the steering system.

In addition, the method can comprise the step of subtracting the steering velocity determined by the steering position from the product value in order to determine the base target velocity of the proportional control loop.

The method can also comprise the step of multiplying the base target velocity by a third and a fourth function value.

The third and fourth function values can together represent the proportionality factor.

The third function value can be determined at least as a function of the rack force and/the fourth function value can be determined at least as a function of the vehicle speed and the steering position determined by the steering system. As a result, both the proportionality factor and the base target velocity can be precisely determined so that the steering return torque requirement can be determined as required.

At least one of the first to fourth function values can be determined based on at least sectionally defined functions and/or by characteristic curves and/or by characteristic diagrams and/or by look-up tables. As a result, the function values can be determined in advance based on test measurements and made available for the driving situation.

The at least sectionally defined functions and/or characteristic curves and/or characteristic diagrams and/or look-up tables can be variable as a function of a desired steering feel. In this way, for example, the determination of the steering return torque requirement can be adapted to a desired driving style. According to the prior art, the functions, characteristic values or tables are also used to adapt the steering feel to changed suspension loads which must be borne by the steering system using scaling factors. In contrast, the rack force dependency advantageously itself adjusts the active restoring component for different suspension loads (vehicle parameters) of different vehicle configurations. Therefore, the functions, characteristic values or tables have fewer variables and are less complex, which makes the determination more precise.

If the underlying steering system does not comprise a rack, but a central rod arranged between the tie rods, the central rod force can also be used instead of the toothed rod force to determine the steering return torque requirement. For such a central rod, too, the relative ratio to the transverse acceleration of the vehicle is generally fixed.

According to an optional sixth exemplary arrangement, the steering system according to the disclosure can comprise a control device which is configured to determine a steering return torque requirement of the steering device according to the method described above. The steering return torque requirement can form at least a portion of a target steering torque with which the steering device can be acted upon by the at least one actuator. The steering system thus makes it possible to determine the steering return torque requirement accordingly and to act on the steering device accordingly, which results in an improved steering feel for the driver because the determination is made faster and more precise.

If the steering system is a steering-by-wire steering system or an electromechanical steering system, the determination of the steering return torque requirement can be used in particular for steering systems having no mechanical coupling between the steering device and steerable components that are used to directly change direction of the vehicle.

All of the features explained with regard to the sixth exemplary arrangement can be transferred to the fifth exemplary arrangement individually or in (sub-)combination.

According to an optional seventh exemplary arrangement, the computer program product according to the disclosure can comprise instructions which, when the program is executed by a computer, cause the computer to determine the steering return torque requirement according to the method described herein.

According to an optional eighth exemplary arrangement, the computer-readable storage medium according to the disclosure can comprise instructions which, when the program is executed by a computer, cause the computer to determine a steering return torque requirement based on at least one rack force of the steering system.

All of the features explained with regard to the seventh and eighth exemplary arrangements can be transferred individually or in (sub-)combination to the fifth and/or sixth exemplary arrangement(s) as well as mutually.

According to an optional ninth exemplary arrangement, the method according to the disclosure can also be coupled with a determination of a steering hysteresis requirement of a steering device of a vehicle—with and without the aforementioned method for determining a steering return torque requirement of a steering device. The supplementary method for determining a steering hysteresis requirement can comprise the step of determining the steering hysteresis requirement based on at least one rack force of the steering system. The steering hysteresis requirement can therefore form a portion of a target steering torque with which the steering device can be acted upon by the at least one actuator (total target torque requirement).

The steering hysteresis requirement can also be determined based at least on a vehicle speed, on a steering position determined by the steering system of the vehicle, and on a steering velocity determined by the steering system. This allows the steering hysteresis requirement to be determined more precisely.

Alternatively or cumulatively, the steering hysteresis requirement can be characterized by an absolute limit value and an absolute slope value.

The rack force can then be taken into account both when determining the absolute limit value and when determining the absolute slope value of the steering hysteresis requirement. The rack force is advantageously used for both sub-parameters of the steering hysteresis requirement, so that the hysteresis can be determined robustly and quickly.

The method can furthermore at least also comprise the step of multiplying at least a first function value and a second function value in order to determine the absolute limit value of the steering hysteresis requirement.

The first function value can be determined at least as a function of the rack force and the second function value can be determined at least as a function of the vehicle speed.

In addition, the determination can comprise the step of multiplying a third function value and a fourth function value in order to determine the absolute slope value of the steering hysteresis requirement.

The third function value can be determined as a function of at least the absolute limit value of the steering hysteresis requirement, the steering position determined by the steering system, the steering velocity determined by the steering system and the steering hysteresis requirement.

The fourth function value can be determined as a function of at least the vehicle speed. As a result, both the limit value of the steering hysteresis requirement and the slope value of the steering hysteresis requirement can be precisely determined so that the steering hysteresis requirement can be determined as a whole as required.

At least one of the first to fourth function values can be determined based on at least sectionally defined functions and/or by characteristic curves and/or by characteristic diagrams and/or by look-up tables. As a result, the function values can be determined in advance based on test measurements and made available for the driving situation.

The at least sectionally defined functions and/or characteristic curves and/or characteristic diagrams and/or look-up tables for determining the steering hysteresis requirement can be variable as a function of a desired steering feel. In this way, for example, the determination of the steering hysteresis requirement can be adapted to a desired driving style. According to the prior art, the functions, characteristic values or tables are also used to adapt the steering feel to changed suspension loads which must be borne by the steering system using scaling factors. In contrast, the rack force dependency advantageously itself adjusts the steering hysteresis requirement for different suspension loads (vehicle parameters) of different vehicle configurations. Therefore, the functions, characteristic values or tables have fewer variables and are less complex, which makes the determination more precise.

The rack force can be based on a measurement, an estimate from a steering model or on a vehicle model and can be provided. In this respect, a sensor can be provided which measures the applied rack force in order to provide corresponding values. Models can also be used in advance to determine the rack force as a function of vehicle parameters and a vehicle speed. This possibility is based on the generally fixed relative ratio of the rack force to the transverse acceleration of the vehicle. Furthermore, the rack force can be based on an estimate, provided that the corresponding steering system is based on steering-dependent variables, vehicle parameters and the vehicle speed. Of course, the approaches can also be combined.

The method expanded to comprise the determination of the steering hysteresis requirement can also be computer-implemented. The determination of the steering hysteresis requirement can accordingly be determined by a data processing unit, which has advantages in terms of the speed of precision. If the underlying steering system does not comprise a rack, but a central rod arranged between the tie rods, the central rod force can also be used instead of the rack force to determine the steering hysteresis requirement. For such a central rod, too, the relative ratio to the transverse acceleration of the vehicle is essentially fixed.

According to an optional tenth exemplary arrangement, the steering system according to the disclosure can comprise a control device which is configured to determine a steering hysteresis requirement of the steering device according to the method described above. The steering hysteresis requirement can form at least a portion of a target steering torque with which the steering device can be acted upon by the at least one actuator. The steering system thus makes it possible to determine the steering hysteresis requirement accordingly and to act on the steering device accordingly, which results in an improved steering feel for the driver because the determination is made faster and more precise.

As already mentioned, the control device can comprise at least one processor and be coupled to a memory device. At least sectionally defined functions and/or characteristic curves and/or characteristic diagrams and/or look-up tables for determining the steering hysteresis requirement can be stored in the memory device, so that at least one of the first to fourth function values can be determined by the control device based on data from the memory device. Using the memory device, the predetermined measured, modeled or estimated function values for different configurations of the steering feel can then also be made available to the control device for processing.

If the steering system comprises at least one sensor by which a rack force applied to the rack can be measured, the respective measured value can be made available for the control device to determine the steering hysteresis requirement.

The determination of the steering hysteresis requirement can therefore be used in particular for steering systems having no mechanical coupling between the steering device and steerable components that are used to directly change direction of the vehicle.

All of the features explained with regard to the tenth exemplary arrangement can be transferred individually or in (sub-)combination to the ninth exemplary arrangement.

According to an optional eleventh exemplary arrangement, the computer program product according to the disclosure can comprise commands which, when the program is executed by a computer, cause the computer to determine the steering hysteresis requirement according to the method described herein.

According to an optional twelfth exemplary arrangement, the computer-readable storage medium according to the disclosure can comprise instructions which, when the program is executed by a computer, cause the computer to determine a steering hysteresis requirement based on at least one rack force of the steering system.

All of the features explained with regard to the eleventh and twelfth exemplary arrangements can be transferred individually or in (sub-)combination to the ninth and/or tenth exemplary arrangement(s) as well as mutually.

BRIEF DESCRIPTION OF DRAWINGS

The disclosure and further advantageous exemplary arrangements and developments thereof are described and explained in more detail below with reference to the examples shown in the drawings. The features to be taken from the description and the drawings can be used individually or collectively in any combination according to the disclosure. In the drawings.

DETAILED DESCRIPTION

Figure 1:
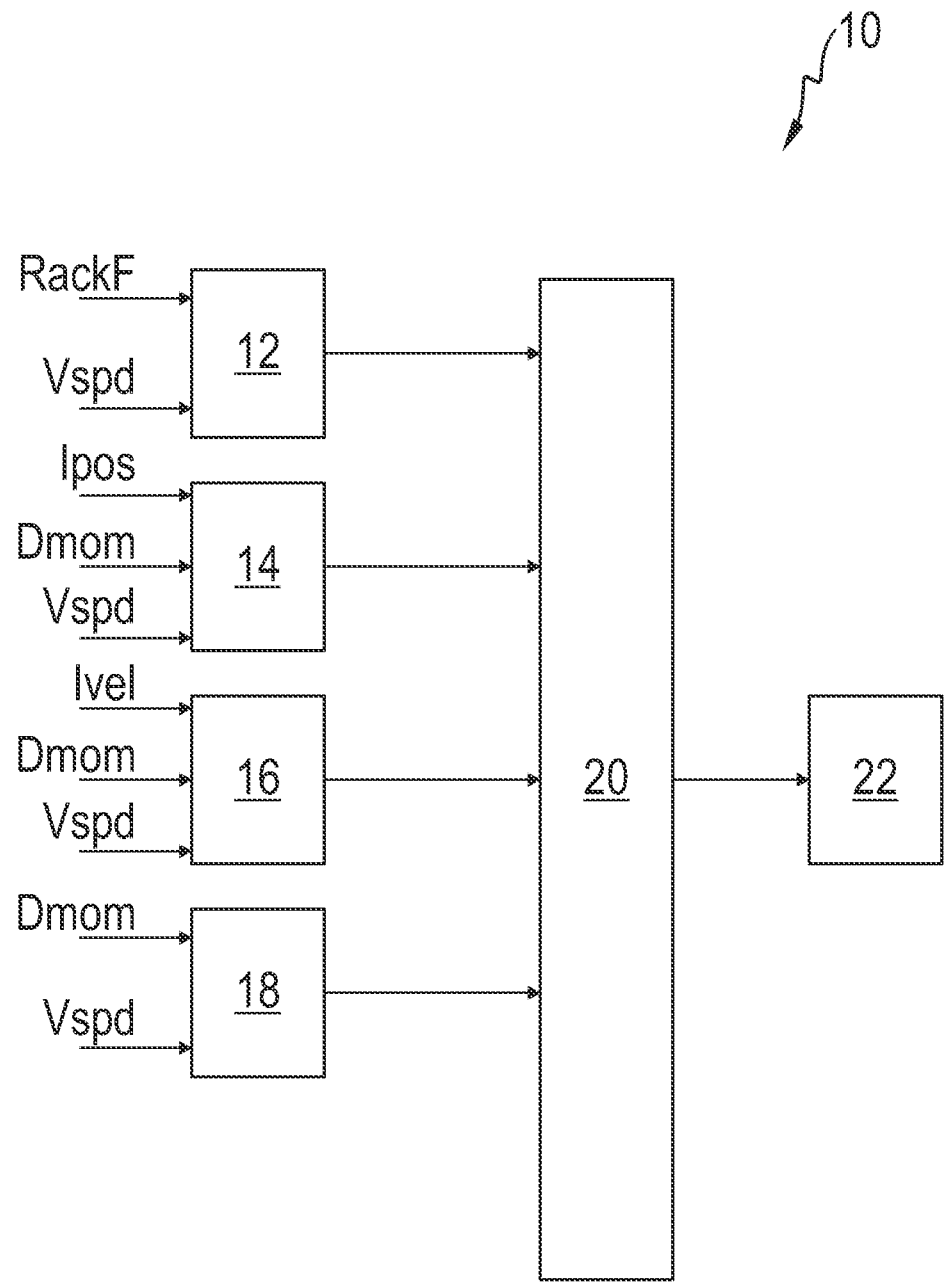
FIG. 1 is a simplified schematic illustration of the determination of a total steering torque requirement according to the prior art.
Figure 2:
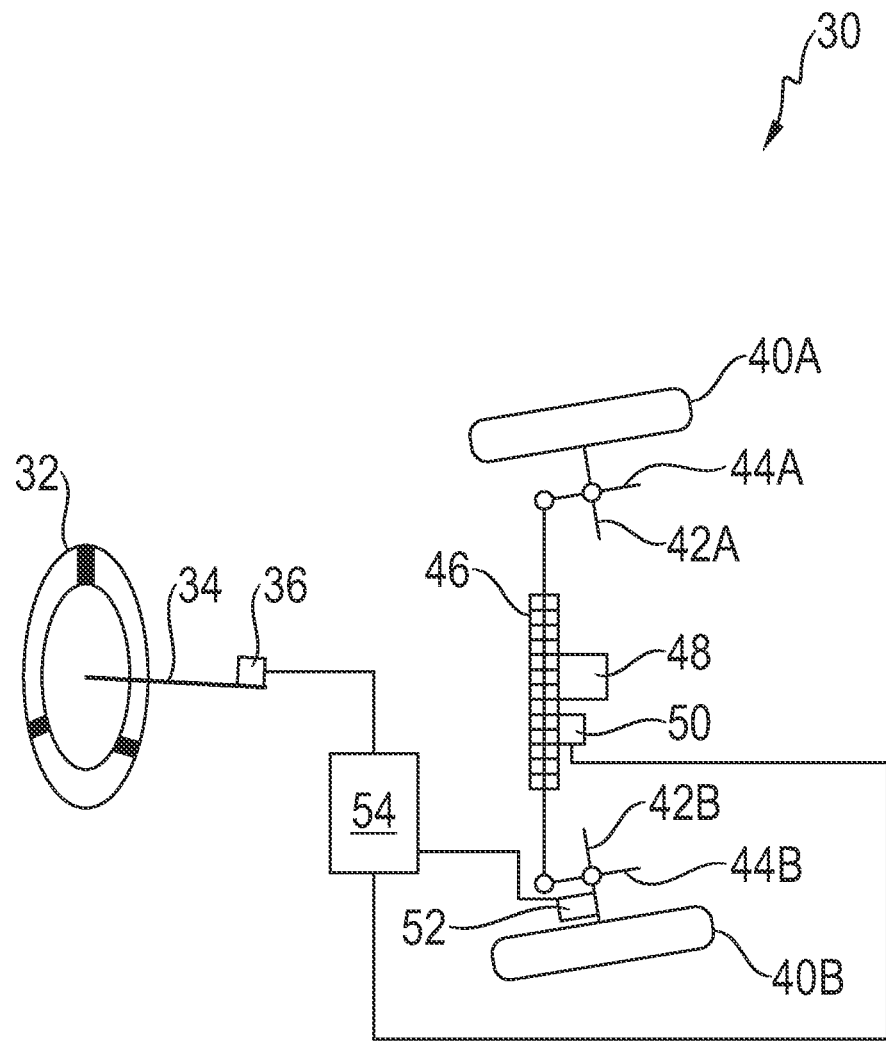
FIG. 2 is a simplified schematic illustration of a steering system.

FIG. 2 is a simplified schematic illustration of a steering system 30. The steering system 30 comprises a steering device 32, in this case a steering wheel. The steering device 32 is coupled to an axle 34. An actuator 36, which interacts with the axle 34, is arranged on the axle. A manipulated variable can be applied to the actuator 36 in order to exert a torque on the axle 34 in accordance with the manipulated variable and thus to feedback a desired steering feel to the driver.

The steering device 32 and its axle 34 are mechanically separated from the rest of the steering system 30, of which the steerable wheels 40A, 40B are shown here by way of example. The wheels 40A, 40B are each coupled to a wheel carrier 42A, 42B, which in turn are coupled to a tie rod 44A, 44B. A toothed rack 46 is arranged between the tie rods 44A, 44B. The rack 46 provides a mechanical coupling for the wheels 40A, 40B so that they are always aligned parallel to one another.

An actuator 48 (pinion) is coupled to the rack 46 and can move the rack out of its central position in order to cause the wheels 40A, 40B to deflect relative to their normal position.

A sensor 50, which measures the force of the toothed rack, is also coupled to the toothed rack 46. For example, in one exemplary arrangement, the sensor 50 can be a strain gauge.

There is also a second sensor 52. The second sensor 52 is configured to determine a relative position of the wheel carrier 42A relative to its normal position. This relative position represents a steering position determined by the steering system of the vehicle. The sensor 52 is also configured to measure the rotational velocity of the wheel carrier 42A relative to the center of rotation when the position of the wheel 40B changes. Of course, this does not mean the wheel rotation, but the steering rotation. This rotational velocity represents a steering velocity determined by the steering system of the vehicle.

The steering system further comprises a control device 54 having a processor. The control device 54 is coupled both to the actuator 36 and to the sensors 50, 52. The sensors 50, 52 transmit corresponding measured values for a rack force, the steering position and the steering velocity to the control device 54. The control unit also receives information about the vehicle speed. The vehicle speed can optionally also be determined by the sensor 52 or by other suitable devices. The control device 54 is configured to determine at least a steering return torque requirement and/or a steering hysteresis requirement and/or a steering damping requirement based on the information received. Alternatively, or cumulatively, the control device 54 can also determine a total target torque requirement from a desired combination of the individual torques.

The control device 54 can optionally be coupled to a memory device in which sectionally defined functions, characteristic values or reference tables can be stored in order to be able to use them in the determination by the control device 54.

Optionally, the control device 54 can be configured to compare the specific steering torque requirement with an actual steering torque. A manipulated variable for the actuator 36 can then be determined and transmitted thereto in order to match the actual steering torque to the steering torque requirement. In any case, the specific steering torque requirement is the variable on which the control of the actuator 36 is based, in order to convey the desired steering feel to the driver.

Figure 3:
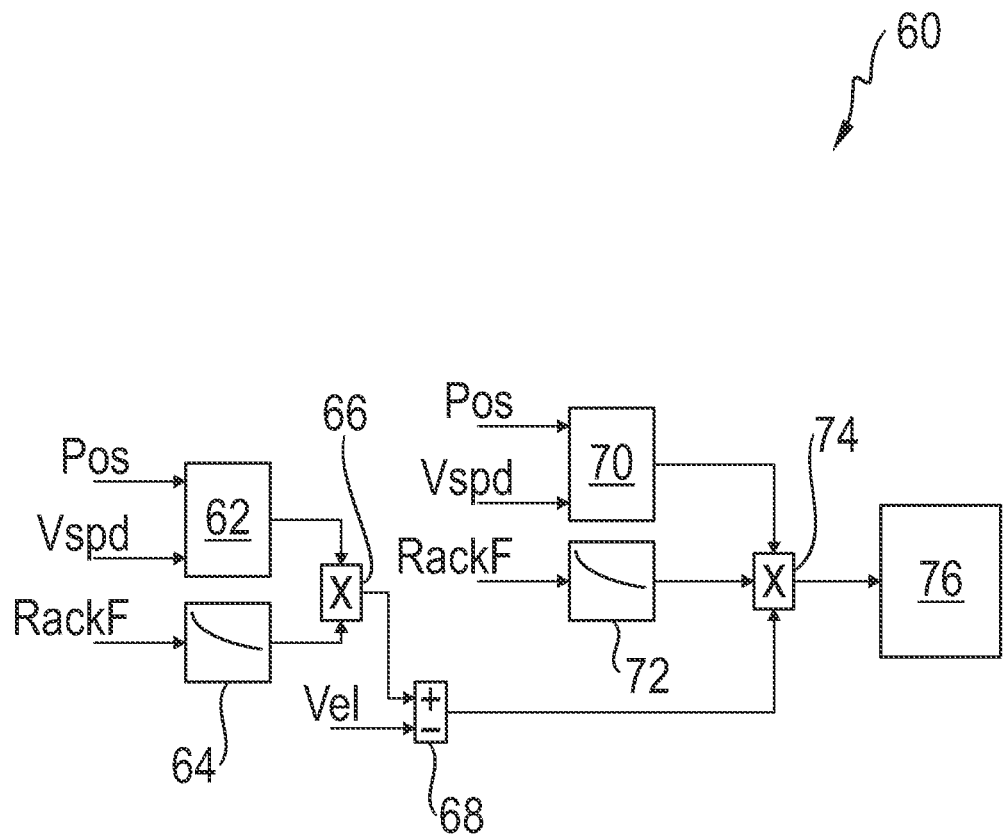
FIG. 3 is a simplified schematic illustration of the determination of the steering return torque requirement according to one exemplary arrangement.

FIG. 3 is a simplified schematic illustration of a determination of the steering return torque requirement according to one exemplary arrangement 60.

A first function value is determined in block 62 as a function of a steering position Pos determined by the steering system of the vehicle and the vehicle speed Vspd. A second function value is determined in block 64 as a function of the rack force RackF. The first and second function values are multiplied in block 66 to determine a product value. The steering velocity Vel determined by the steering system of the vehicle is then subtracted from the product value in block 68. In this way, a base target velocity is determined.

In block 70, a third function value is determined based on a steering position Pos determined internally by the steering system or externally in the vehicle and the vehicle speed Vspd. In block 72, a fourth function value is determined based on the rack force RackF. The third and fourth function values represent a proportionality factor. The third and fourth function values are then multiplied in block 74 by the product value from block 68, i.e. the base target velocity. As a result, the steering return torque requirement can be determined in block 76.

The blocks 62, 64, 70, 72 can include at least sectionally defined functions and/or characteristic values and/or characteristic diagrams and/or reference tables in order to be able to adapt the values determined in each case to a desired driving experience.

Figure 4:
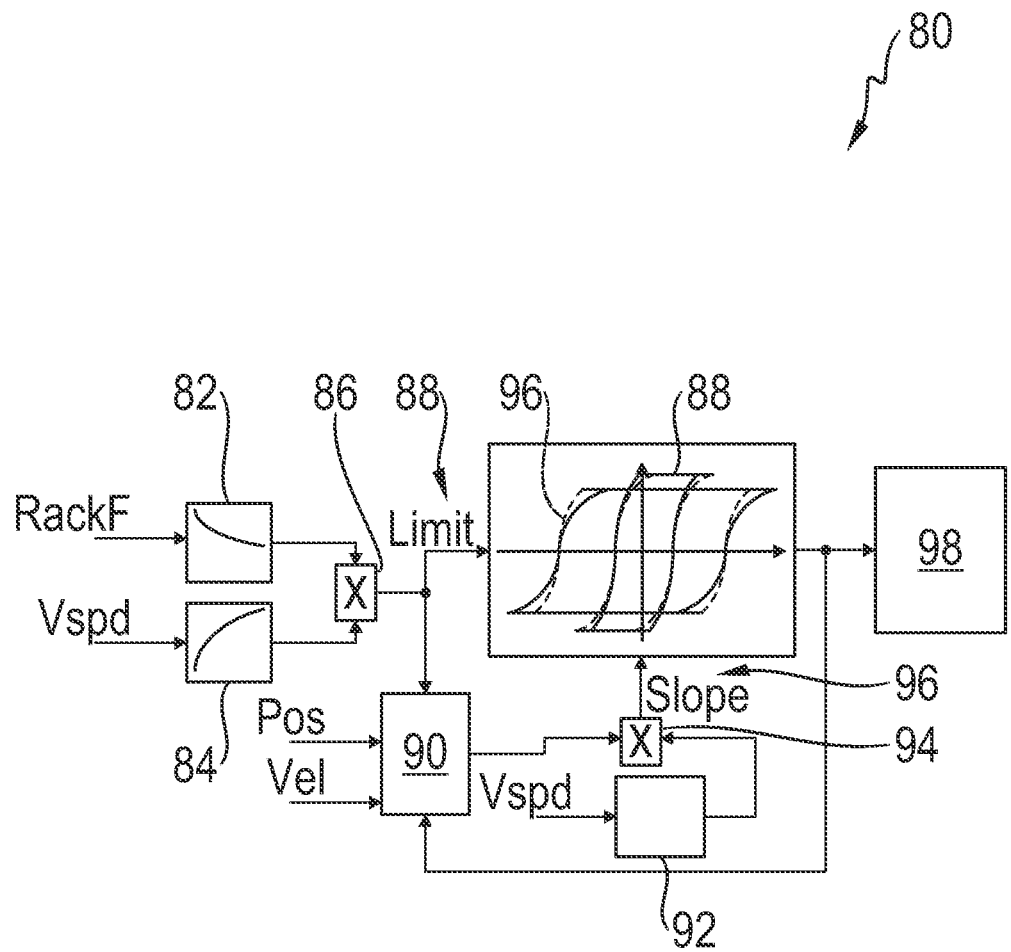
FIG. 4 is a simplified schematic illustration of the determination of the steering hysteresis requirement according to one exemplary arrangement.

FIG. 4 is a simplified schematic illustration of the determination of the steering hysteresis requirement according to one exemplary arrangement 80.

In block 82, a first function value is determined as a function of the rack force RackF. In block 84, a second function value is determined based on the vehicle speed Vspd. The first and second function values are multiplied in block 86. As a result, an absolute limit value (Limit) of the steering hysteresis requirement is determined.

In addition, a third function value is determined in block 90 based on the steering position Pos determined by the steering system, the steering velocity Vel determined by the steering system and the limit value determined beforehand. As an additional input variable for determining the third function value, block 90 comprises a feedback loop, so that the determined steering hysteresis requirement is also taken into account.

In block 92, a fourth function value is determined based on the rack force RackF.

The third and fourth function values are multiplied in block 94 in order to determine the absolute slope value (Slope) of the steering hysteresis requirement.

As a result, the steering hysteresis requirement is determined both in the limit value and in the slope, so that the situation-dependent steering hysteresis requirement is determined in block 98.

The blocks 82, 84, 90, 92 can include at least sectionally defined functions and/or characteristic values and/or characteristic diagrams and/or reference tables in order to be able to adapt the values determined in each case to a desired driving experience.

Figure 5:
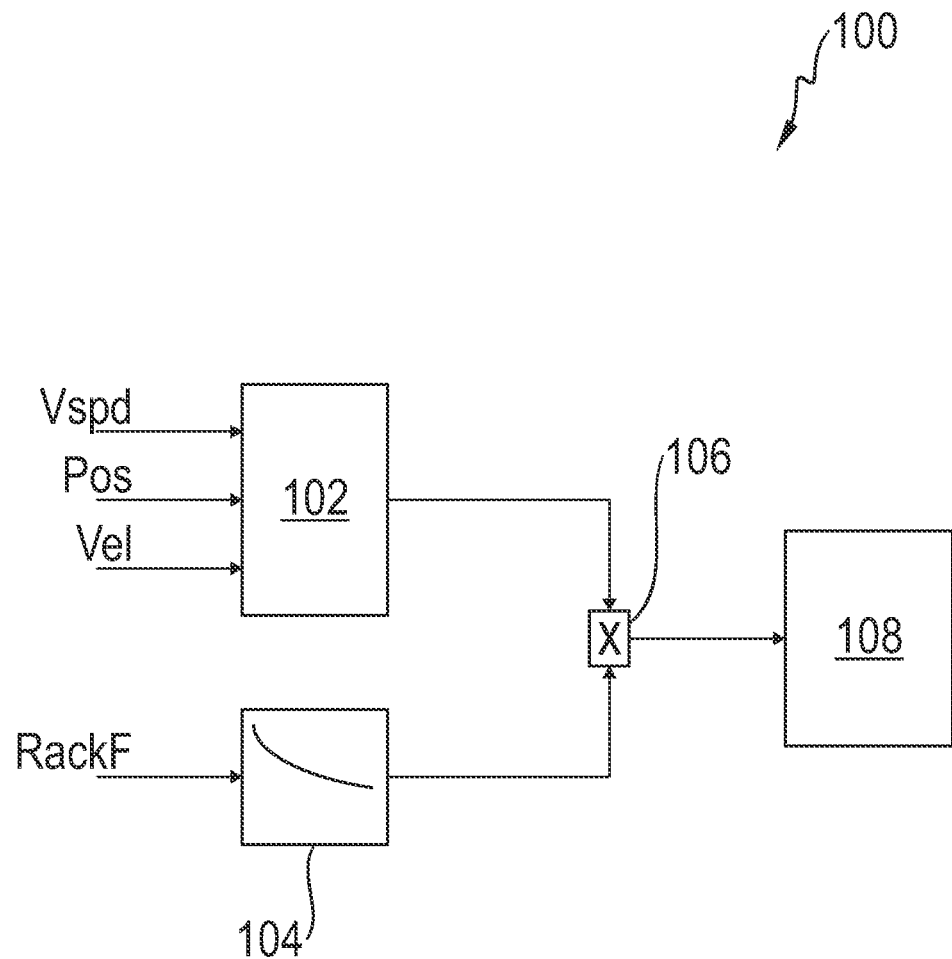
FIG. 5 is a simplified schematic illustration of the determination of the steering damping requirement according to one exemplary arrangement.

FIG. 5 is a simplified schematic illustration of the determination of the steering damping requirement according to one exemplary arrangement 100.

A first function value is determined in block 102 as a function of a vehicle speed Vspd, a steering position Pas determined by the steering system of the vehicle and a steering velocity Vel determined by the steering system of the vehicle. Based on the rack force RackF, a second function value is determined in block 104. The first and second function values are multiplied in block 106 in order to determine the steering damping requirement in block 108.

The blocks 102, 108 can include at least sectionally defined functions and/or characteristic values and/or characteristic diagrams and/or reference tables in order to be able to adapt the values determined in each case to a desired driving experience.

While the disclosure has been illustrated and described with respect to one or more implementations, upon reading and understanding this specification and the accompanying drawings, those skilled in the art will identify equivalent changes and modifications. Furthermore, while a particular feature of the disclosure may have been disclosed in relation to only one of a plurality of implementations, that feature may be combined with one or more other features of the other implementations.

The invention claimed is:

1. A method for determining a steering damping requirement of a steering device of a vehicle, wherein the steering device is part of a steering system of the vehicle and is coupled to at least one actuator which is configured to apply a steering torque to the steering device, the method comprising:
determining a steering damping requirement based on at least one rack force of the steering system, wherein the steering damping requirement forms at least a portion of a target steering torque with which the steering device can be acted upon by the at least one actuator; and
multiplying at least a first function value and a second function value in order to determine the steering damping requirement, wherein the first function value is determined at least as a function of the rack force, and wherein the second function value is determined at least as a function of a vehicle speed, a steering position determined by the steering system and a steering velocity determined by the steering system.

2. The method according to claim 1, wherein the steering damping requirement is further determined based at least on a vehicle speed, on a steering position determined by the steering system of the vehicle, and on a steering velocity determined by the steering system.

3. The method according to claim 1, wherein at least one of the first to second function values is determined based on at least sectionally defined functions and/or by characteristic curves and/or by characteristic diagrams and/or look-up tables.

4. The method according to claim 3, wherein the at least sectionally defined functions and/or characteristic curves and/or characteristic diagrams and/or look-up tables are variable as a function of a desired steering feel.

5. The method according to claim 1, wherein the rack force is based on a measurement, an estimate from a steering model or on a vehicle model.

6. The method according to claim 1, wherein the method is implemented by a computer.

7. A steering system for a vehicle, wherein the steering system comprises at least one steering device, a rack, a control device, at least one sensor, and at least one actuator, the control device being coupled to the actuator,
wherein the control device is configured to determine a steering damping requirement of the steering device based on at least one rack force of the steering system, and wherein the steering damping requirement forms at least a portion of a target steering torque with which the steering device can be acted upon by the at least one actuator; and wherein the control device is configured to multiply at least a first function value and a second function value to determine the steering damping requirement, wherein the first function value is determined at least as a function of the rack force, and wherein the second function value is determined at least as a function of a vehicle speed, a steering position determined by the steering system and a steering velocity determined by the steering system.

8. The steering system according to claim 7, wherein the control device is configured to determine the steering damping requirement, wherein the control device comprises at least one processor and is coupled to a memory device, wherein at least sectionally defined functions and/or characteristic curves and/or characteristic diagrams and/or look-up tables are stored in the memory device, so that at least one of the first and second function values can be determined by the control device based on data from the memory device, and wherein the processor is designed to determine the steering damping requirement based on at least one rack force of the steering system.

9. The steering system according to claim 7, wherein the steering system further comprises at least one sensor device configured to measure a rack force applied to the rack.

10. The steering system according to claim 7, wherein the steering system is one of a steering-by-wire steering system and an electromechanical steering system.

11. A computer program product, comprising instructions which, when the program is executed by a computer, cause the computer to determine the steering damping requirement based on at least one rack force of the steering system, wherein the steering damping requirement forms at least a portion of a target steering torque with which the steering device can be acted upon by the at least one actuator and wherein the computer further multiplies at least a first function value and a second function value to determine the steering damping requirement, wherein the first function value is determined at least as a function of the rack force, and wherein the second function value is determined at least as a function of a vehicle speed, a steering position determined by the steering system and a steering velocity determined by the steering system.

12. The method according to claim 2, wherein the method further comprises at least the step of:

multiplying at least a first function value and a second function value in order to determine the steering damping requirement, wherein the first function value is determined at least as a function of the rack force, and wherein the second function value is determined at least as a function of the vehicle speed, the steering position determined by the steering system and a steering velocity determined by the steering system.

13. The method according to claim 12, wherein at least one of the first to second function values is determined based on at least sectionally defined functions and/or by characteristic curves and/or by characteristic diagrams and/or look-up tables.

14. The method according to claim 13, wherein the rack force is based on a measurement, an estimate from a steering model or on a vehicle model.

* * * * *